United States Patent Office 3,203,856
Patented Aug. 31, 1965

---

3,203,856
3,5-DIMETHOXY-4-BUTYLOXY-BENZAMIDE SEDATIVE ACTION METHOD
Roland-Yves Mauvernay, Riom, France, assignor to Centre Europeen de Recherches Mauvernay, Chateau de Bardon, Riom (Puy-de-Dome), France
No Drawing. Filed Sept. 27, 1962, Ser. No. 227,655
Claims priority, application France, July 3, 1962, 902,774
1 Claim. (Cl. 167—52)

The present invention relates to a new 3,5-dimethoxy-benzamide derivative, and more particularly to such derivative which has a good sedative action.

It is an object of the present invention to provide a new sedative.

It is another object of the present invention to provide a new 3,5-dimethoxy-benzamide derivative.

It is yet another object of the present invention to provide a method of producing the compound of the invention.

As still another object of the present invention sedative compositions are contemplated.

With the above and other objects in view, the present invention mainly comprises as a new compound 3,5-dimethoxy-4-butyloxy-benzamide.

This compound may be produced by reacting 3,4,5-trimethoxy-benzamide with concentrated sulfuric acid to form the corresponding 3,5-dimethoxy-4-hydroxy-benzamide, and then to react the formed 3,5-dimethoxy-4-hydrox-benzamide with a butyl halide, particularly butyl bromide.

The method of the present invention is illustrated by the following equations:

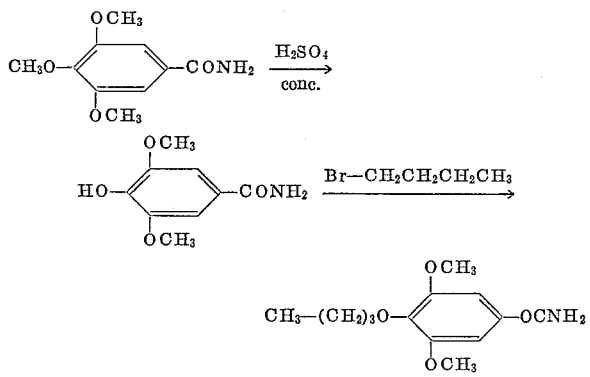

The compound of the present invention is found to have a sedative action, with hypnotic effect, and in addition is found to very strongly potentiate the soporific action of barbiturates such as pentobarbital.

The compound also has an analgesic action. As a sedative the compound can be used for all neurotic states, insomnia, anxiety, etc.

The following example illustrates the production of the compound of the present invention. The scope of the invention is not, however, meant to be limited to the specific details of the example.

*Example*

200 g. of very dry 3,4,5-trimethoxy-benzamide are added to 800 cc. of concentrated sulfuric acid. The mixture is placed in a thermostatically controlled bath at a temperature maintained between 40 and 45° C. After about 2 hours the dissolution of the product into the sulfuric acid is complete and the reaction is ended after about 23 hours.

The solution is then slowly poured into 2 kg. of crushed ice. It is permitted to stand for a few hours, filtered and washed with cold water. The precipitate is shaken with a saturated solution of sodium bicarbonate, filtered, washed with water and recrystallized in water.

There is thus obtained 3,5-dimethoxy-4-hydroxy-benzamide in the form of white needles melting at 184–185° C. The compound is completely soluble in dilute sodium hydroxide or potassium hydroxide. The solution gives a green color to ferric chloride. The calculated amount of nitrogen is 7.11%, and the amount found is 7.08%.

0.1 mol (19.7 g.) of the thus formed 3,5-dimethoxy-4-hydroxy-benzamide are dissolved in 120 cc. of ethyl alcohol. There is then added thereto 0.11 mol (15 g.) of n-butyl bromide. The reaction is brought to reflux and there is added, dropwise, with agitation, an equivalent quantity of potassium hydroxide dissolved in 15 cc. of water (in order to avoid setting of the phenate which would slow the speed of reaction).

After 7–8 hours of refluxing, the reaction is completed. The solvent is evaporated under vacuum, and the residue is washed with dilute sodium carbonate and then with water. The compound is recrystallized from a mixture of equal parts of methanol and water. There is thus obtained silky white needles of 3,5-dimethoxy-4-n-butyloxy-benzamide having a melting point of 138° C. The yield is 83%.

The $LD_{50}$ of the compound, on mice, upon peroral administration, was determined by the method of Behrens and Karber. The product was given, in increasing doses, to lots of 6 animals which were kept under observation during a 48 hour period.

The $LD_{50}$ per os is 2600 mg./kg. In comparison thereto, the $LD_{50}$ on mice for meprobamate is 1800 mg./kg.

The hypnotic action was determined by oral administration of the product to groups of 20 mice. The $ED_{50}$ dose (dose which causes 50% of the animals to sleep) is 650 mg./kg. Consequently, the ratio of $LD_{50}$ to $ED_{50}$ is 4. In the case of meprobamate this ratio is 2.25.

In addition, the compound of the present invention was found to strongly potentiate the soporific action of barbiturates such as pentobarbital.

The $ED_{50}$ of pentobarbital, per os is 40 mg./kg. The $ED_{50}$ of pentobarbital+250 mg./kg., per os of the 3,5-dimethoxy-4-butyloxy-benzamide of the present invention is 20 mg./kg., and the $ED_{50}$ of pentobarbital+500 mg./kg. of the compound, per os is 3 mg./kg.

Under the same conditions, the $ED_{50}$ of pentobarbital+meprobamate (250 mg./kg.) is 10/12 mg./kg., and with 500 mg./kg. meprobamate is 3/4 mg./kg.

The compound is also found to have a protective action against fatal doses of cardiazol. Thus, the $ED_{50}$ of the compound, per os is 125 mg./kg. whereas the $ED_{50}$ of meprobamate, per os is 75 mg./kg. Thus, the ratio of the $LD_{50}/ED_{50}$ cardiazol of the compound of the present invention is 20, whereas it is 24 in the case of meprobamate.

The compound of the present invention is also found to have an analgesic action as determined by electric stimulation of the dental pulp on rabbits. The analgesic action is shown in volts by increase of the pain threshold after administration of the compound in a dose of 500 mg./kg., per os. It is found that 3,5-dimethoxy-4-butyloxy-benzamide increases the pain threshold from +5 to +15 volts.

The compound of the present invention can be used in the form of tablets, sugar-coated tablets, or the like, containing 0.25 g. to 0.50 g. per tablet, and administered in an amount of 1 to 6 tablets daily. The compound can also be used in the form of suppositories for children and adults containing 0.25 g. of the active ingredient and administered 1 to 3 times daily.

The compound can be used in compositions with normal barbiturates such as pentobarbital, secobarbital, amobarbital, cycloheptenylethylmalonylurea, or the like, in the form of tablets, dragées, suppositories, or the like, in an amount of 100 parts of the 3,5-dimethoxy-4-butyloxy-benzamide per each 5 to 10 parts of the barbiturate. Such tablets may be administered 1 to 6 times daily, and suppositories 1 to 3 times daily.

Without further analysis, the foregoing will so fully reveal the concept of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

The method of achieving a sedative action, which comprises administering to a patient requiring the same 3,5-dimethoxy-4-butyloxy-benzamide.

References Cited by the Examiner

UNITED STATES PATENTS

| | | | |
|---|---|---|---|
| 2,819,305 | 1/58 | Lott | 260—559 |
| 2,870,145 | 1/59 | Perron | 260—247.2 |
| 2,912,453 | 11/59 | Moffett | 260—559 |
| 2,937,118 | 5/60 | Von Haxthausen et al. | 167—65 |
| 3,036,128 | 5/62 | Moffett | 260—559 |
| 3,063,902 | 11/62 | Gray et al. | 167—65 |

OTHER REFERENCES

Chem. Abst., vol. 54, p. 6607(c), 1960; vol. 55, 15402(e), 1961.

FRANK CACCIAPAGLIA, JR., *Primary Examiner.*

DUVAL T. McCUTCHEN, LEWIS GOTTS, *Examiners.*